Dec. 21, 1954  A. CHERKIN ET AL  2,697,521
BLOOD FILTER
Filed Aug. 10, 1950
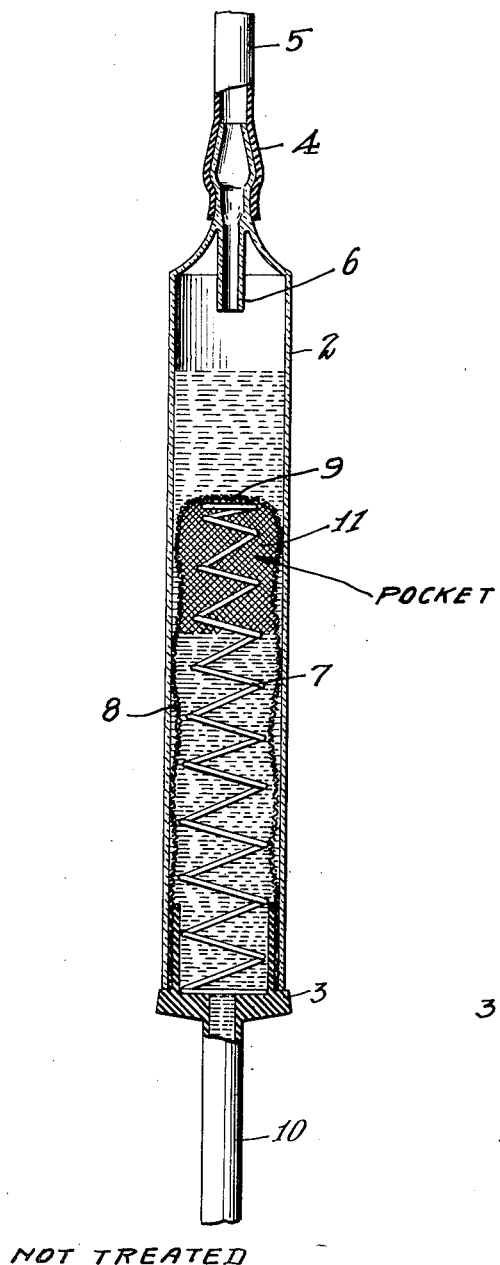
NOT TREATED
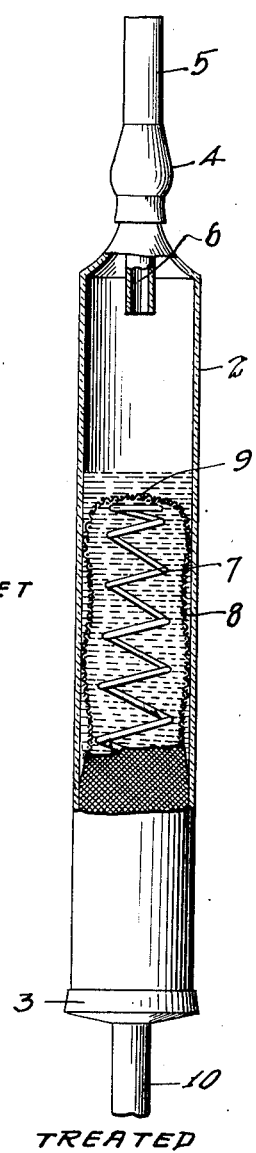
TREATED
INVENTORS
Arthur Cherkin
Stephen D. Thornton Jr.
BY
Lyon & Lyon
ATTORNEYS

United States Patent Office 2,697,521
Patented Dec. 21, 1954

2,697,521

BLOOD FILTER

Arthur Cherkin and Stephen D. Thornton, Jr., Glendale, Calif., assignors to Don Baxter, Inc., Glendale, Calif., a corporation of Nevada Application August 10, 1950, Serial No. 178,714

4 Claims. (Cl. 210—164)

This invention relates to a filter and while not necessarily confined thereto is particularly directed to the type of filter used in blood administration sets.

In the operation of blood administration sets frequent cases of reports of leak of air at the drip housing filter-support-stopper are encountered which, on investigation, have proven not to be occasioned by leaks but by failure of the operator to properly clear the filter of air prior to using the set. Heretofore in use of blood administration sets after about ten or fifteen minutes of use small bubbles followed by large bubbles, and in some cases alternate air and fluid, are observed in the tubing between the drip housing and needle adapter. This has been found to be due to the fact that when a drip housing having a blood filter of conventional type is filled a large bubble of air is entrapped and remains in the tube of the filter. At the first part of the operation, blood filters through the lower part of the filter but in a few minutes, depending upon the amount of clot in the blood, the filter builds up a coat which impedes the flow of blood through the filter. The hydrostatic head below the filter then exerts a pull compressing the filter and spring which forces the air bubbles down and slowly out into the tube leading to the needle adapter. Accordingly there exists a need for the design of a filter as a part of a blood administration set which filter will not entrap air under any conditions of filling the housing containing the filter.

It is the general object of the present invention to provide a filter and a method of producing the same, which filter will not entrap air in use. We have discovered that by applying a silicone coating to filters it is possible to eliminate the entrapping of air by such filters. A filter coated in accordance with the present invention permits a free passage of air through the filter even when the filter is completely submerged with the fluid. It appears that prior filters employed in administration sets have trapped air for the reason that the adhesion between the fluid (blood) and the surface of the filter has in the past been sufficiently high as to provide a film across the apertures of the filter which will not permit all of the air within a filter to break through the apertures when the filter is filled.

In accordance with the present invention the surface of the filter is coated with a material which sufficiently reduces the adhesion of the fluid molecules to the surface of the filter to decrease the strength of the fluid films over the aperture to a point where entrapped air bubbles within the filter readily break through the apertures so that the filter becomes completely cleared of air.

A number of factors are important to the filter of the present invention. The filters generally used in blood transfusion sets are nylon mesh filters but it has been determined that the type of material of which the filter is composed does not affect the air entrapment qualities of a given coating. Screens made of cloth material, such as silk, nylon and rayon, are all satisfactory for the purpose of the present invention, provided, of course, that they are given a proper adherent coating. Metal screens may also be employed but are not generally recommended because they present problems, such as the removal of surplus treating material, the adhesion of coating, etc. Furthermore, the present invention is applicable only to screens of proper mesh or aperture size. If the apertures of the screen are sufficiently large air has no difficulty passing through the screen openings even without the use of the coating of the present invention, whereas if the apertures are too small the coating of the present invention may not be adequate to prevent air entrapment. In general, the present invention is applicable to filters having apertures between 0.0000084 sq. in. and 0.000084 sq. in. This aperture range, however, is more than sufficient to cover all the useful range of blood filters which at present lie between 50 and 200 mesh.

Of utmost importance to the present invention is the factor of continuity of the coating of the filter. Coatings which are only apparently continuous may allow the fluid to contact the surface of the covered material sufficiently to modify the properties of the filter and produce unsatisfactory air entrapment properties. Any pinholes or incomplete coverage of the surface of the filter by the coating material may well result in a product which is unsatisfactory. It is obvious that in coating a fine mesh screen care must be taken to avoid such excess of coating material as will close the openings of the screen and accordingly the first efforts were made with the present invention to apply coatings to the screen by a solvent process. Various solvents, such as carbon tetrachloride and gasoline, were employed in efforts to produce proper coatings but the resulting coatings were uniformly unsuccessful from the standpoint of air entrapment properties. It is believed that the failure of this solvent method was occasioned by the evaporation of the solvent leaving pinholes which permitted the fluid to contact the surface of the covered material. It was accordingly found desirable, in order to carry out the objects of the present invention, to provide a method for properly coating filters so as to at one time provide a coating free of excess material and at the same time form such a coating as was continuous and free of pinholes.

The method found successful in the present invention involves the step of applying the coating as a liquid oil to the filter as by tumbling the filter or filters with measured quantities of oil followed by the steps of pressing the filters between absorbent materials to remove excess of oil and to further equalize the distribution, and finally baking the filters to polymerize the oil to form the final coating.

The filter of the present invention eliminates air entrapment by the reducing of adhesion of the molecules of fluid to the molecules of the material. A convenient measure of the adhesion for molecules of a fluid to molecules of a material is the contact angle of a drop of fluid upon that material. A contact angle of 180° would indicate no adhesion. The contact angle between fluids, such as water, saline solution, blood, etc., and a filter of silk, nylon, rayon, etc., is generally below about 38°. We have found that any coating that is continuous and adherent which possesses a contact angle of more than 100° will eliminate air entrapment from the filters in the range of 50 to 150 mesh. While various materials may be employed to form such coatings, such as mineral oil, paraffine, beeswax, etc., the only fully satisfactory coatings are those produced by the employment of silicones. Coatings with mineral oil produce erratic results. It is difficult to obtain continuous coatings with beeswax and paraffine and they are subject to cracking in handling. Silicone oils, such as Dow Corning DC 104 and DC 1107 have been found most satisfactory. Dry Film 9987 silicone; G. E. 81082 silicone are also satisfactory although Dry Film 9987 has a disadvantage of being chlorosilane silicone which necessitates hydrolysis to form an inert silicone film.

The filters of the present invention, together with the process of producing the same, will be more completely understood from the following description of a preferred form or example of a filter embodying the invention, the description being given in connection with the accompanying drawings, in which Figure 1 is an elevation partially in section of a blood drip housing including a filter illustrating the action of a normal filter entrapping air, and Figure 2 is a similar view which includes a coated filter in accordance with the present invention.

Referring to the drawings, as a part of a blood administration set there is often provided a drip housing in the form of a glass tube 2 provided with a rubber plug 3 at its lower end. The upper end is provided with a nipple 4 to which a tube 5 may be attached, which may lead to a blood dispenser. The nipple 4 terminates within the housing 2 in a drip outlet 6 to which blood is intended to drip. Within the housing 2 there is provided a coiled spring 7 which is intended to support a filter 8. This filter 8 is in the form of a fabric tube or stocking closed at its upper end 9 as indicated, the lower end being clamped between the rubber stopper 3 and the lower end of the tube 2. This filter is employed for removing clots, etc., from the blood which is passed from the drip housing through the outlet 10 towards the administration needle.

At the start of the use of such a drip housing filter (unless the same is very carefully manipulated during filling of the housing to submerge the filter 8) a large bubble of air, such as indicated at 11, becomes entrapped in the upper end of the filter. Figure 2 illustrates the filter of the present invention in which no bubble of air is entrapped.

The difference between the filters shown in Figures 1 and 2 is due to the coating. The thickness of the coating to be applied to the filter is immaterial after the surface is covered (so long as such an excess is not provided as would form a film over the openings of the filter). Since the purpose of the coating is to prevent air entrapment, which is purely surface phenomenon, a layer of coating beyond a few molecules thickness is superfluous. It is sufficient generally to provide a coating of about 1.1 gm. of polymerized resin per 100 sq. cm. This is equivalent to the application of 75 cc. of silicone (for example, DC 1107) for 1000 filters of the size normally employed in blood administration sets. In coating such filters a number of the filters, such as indicated at 8 in the drawings, are preferably placed within a drum to which is added about 75 cc. of silicone per 1000 filters and the filters tumbled to contact the same with the silicon oil. The filters are then removed and placed between nylon cloth in a layer about ¼″ thick with towels upon both sides of the cloth. A pressure of 1000 p. s. i. is applied using a hydraulic press, for the purpose of removing excess silicone and to further equalize the distribution. The filters are then baked to polymerize the silicone. The amount of baking may vary somewhat with the silicone oil utilized, which information is usually best obtained from the manufacturers of the silicone oil but, for example, where the silicone oil used is DC 1107 the baking is generally around 3 to 5 minutes at 300° F.

While the particular form of the filter and the method of producing the same herein described is well adapted to carry out the objects of the present invention, various modifications and changes may be made, and this invention is of the scope set forth in the appended claims.

We claim:
1. A filter for passing an aqueous fluid without air entrapment which comprises, a tubular fabric having a closed end, the particular fabric having a mesh of between 50 and 200, the fabric having a substantially uniform continuous thin adherent film of a polymerized silicone resin.

2. A filter for passing an aqueous fluid without air entrapment, said filter comprising, a tubular mesh material having a closed end, the tubular mesh material having a mesh of between 50 and 200, the mesh of the filter being coated with a substantially uniform continuous thin adherent film of a polymerized silicone resin, the coating being free of pin holes so the mesh material cannot be wet with an aqueous fluid.

3. A blood filter apparatus which comprises, a tubular transparent container, a tubular filter within said container, a spring within said filter for holding the same in an extended position, the filter having a substantially uniform continuous thin adherent film of a polymerized silicone resin, the filter having a mesh of between 50 and 200.

4. A blood filter apparatus which comprises, a tubular container, a nipple extending into one end of said container, a tubular filter secured to the other end of said container and extending into the container, having a closed end within the container, a spring for holding the filter in an extended position, such filter being formed of fabric between 50 and 200 mesh, having a substantially uniform continuous thin adherent film of a polymerized silicone resin.

References Cited in the file of this patent

UNITED STATES PATENTS

| Number | Name | Date |
|---|---|---|
| 2,014,105 | Dooley | Sept. 10, 1935 |
| 2,145,047 | Goldkamp | Jan. 24, 1939 |
| 2,162,043 | Westlund et al. | June 13, 1939 |
| 2,186,987 | Nesset | Jan. 16, 1940 |
| 2,306,222 | Patnode | Dec. 22, 1942 |
| 2,341,114 | Novak | Feb. 8, 1944 |
| 2,435,820 | Diggs | Feb. 10, 1948 |
| 2,469,625 | Barry | May 10, 1949 |
| 2,473,153 | Sager | June 14, 1949 |
| 2,477,779 | Zerner | Aug. 2, 1949 |
| 2,555,607 | Robinson | June 5, 1951 |
| 2,556,722 | Hersberger | June 12, 1951 |
| 2,571,059 | Puschelberg et al. | Oct. 9, 1951 |
| 2,586,513 | Butler | Feb. 19, 1952 |